United States Patent
Pearson et al.

(10) Patent No.: US 12,260,266 B2
(45) Date of Patent: Mar. 25, 2025

(54) COMPUTE LOAD BALANCING IN A DISTRIBUTED ENVIRONMENT

(71) Applicant: Google LLC, Mountain View, CA (US)

(72) Inventors: Alan Pearson, Seattle, WA (US); Yaou Wei, Kirkland, WA (US)

(73) Assignee: Google LLC, Mountain View, CA (US)

( * ) Notice: Subject to any disclaimer, the term of this patent is extended or adjusted under 35 U.S.C. 154(b) by 450 days.

(21) Appl. No.: 17/691,570

(22) Filed: Mar. 10, 2022

(65) Prior Publication Data
US 2023/0289240 A1    Sep. 14, 2023

(51) Int. Cl.
  G06F 9/44    (2018.01)
  G06F 9/48    (2006.01)
  G06F 9/50    (2006.01)

(52) U.S. Cl.
  CPC .......... G06F 9/5088 (2013.01); G06F 9/4875 (2013.01); G06F 9/5077 (2013.01); *G06F 2209/505* (2013.01)

(58) Field of Classification Search
  CPC .................................................... G06F 9/5088
  USPC .......................................................... 718/104
  See application file for complete search history.

(56) References Cited

U.S. PATENT DOCUMENTS

2019/0327313 A1* 10/2019 Chen ................... H04L 41/0896
2020/0065415 A1  2/2020 Estanislao et al.

FOREIGN PATENT DOCUMENTS

CN    106126340 B    11/2018
CN    113886091 A    1/2022

OTHER PUBLICATIONS

International Search Report and Written Opinion for International Application No. PCT/US2023/014773 dated May 17, 2023. 13 pages.

* cited by examiner

*Primary Examiner* — Timothy A Mudrick
(74) *Attorney, Agent, or Firm* — Lerner David LLP

(57) ABSTRACT

A system and method of balancing data storage among a plurality of groups of computing devices, each group comprising one or more respective computing devices. The method may involve determining a compute utilization disparity between the group having a highest level of compute utilization and the group having a lowest level of compute utilization, determining a transfer of one or more projects between the plurality of groups of computing devices that reduces the compute utilization disparity, and directing the plurality of groups of computing devices to execute the determined transfer.

20 Claims, 5 Drawing Sheets

COMPUTE LOAD BALANCING IN A DISTRIBUTED ENVIRONMENT

BACKGROUND

Cloud computing systems sometimes include a distributed data analysis engine, which operates in multiple data centers distributed globally. Each data center contains one or more servers. Users of such cloud computing systems may create organizations and projects. Within a project, the distributed data analysis engine allows users to create data sets and tables. Internally, tables are partitioned into units of data replication, called storage sets. Each storage set corresponds to one or more files stored on a server. While users typically query their own data sets, it is also possible for one user to share data sets with another user or make them publicly available to many users. Multiple data sets may be joined together at query time, which potentially requires the system to read data from a large number of distinct data sets, possibly belonging to arbitrary users.

Data sets may be strategically stored across the distributed computing system. Typically, the techniques for strategic data storage involve identifying projects with shared data sets and storing the projects with the most frequently shared data sets on the same computing device within the distributed computing system.

However, strategic data storage can lead to large groups of projects being clustered at a single computing device, while other computing devices are left with few if any projects. This leads to an imbalance in compute utilization between computing devices, whereby some computing devices are overutilized while other computing devices are underutilized.

BRIEF SUMMARY

The present disclosure computes a difference in utilization between the most overutilized and the most underutilized computing devices of the system, and then determines a rebalancing of compute loads to reduce the utilization disparity. An assignment solver may analyze compute utilization, among other factors. A set of project assignments that minimizes compute utilization disparity between among computing devices of the system may be an optimized storage solution.

One aspect of the disclosure is directed to a method of load balancing among a plurality of groups of computing devices, each group comprising one or more respective computing devices. The method may include: determining, by one or more processors, a first group of computing devices having a highest level of compute utilization and a second group of computing devices having a lowest level of compute utilization; determining, by the one or more processors, a transfer of one or more projects between the plurality of groups of computing devices that reduces a compute utilization disparity between the first and second groups of computing devices; and directing, by the one or more processors, the plurality of groups of computing devices to execute the determined transfer.

In some examples, determining the compute utilization density may include: for each group of computing devices: determining, by the one or more processors, a compute load of the group of computing devices; determining, by the one or more processors, an amount of available computation resources of the group of computing devices; and calculating, by the one or more processors, a compute utilization of the group of computing devices based on the compute load and the amount of available computation resources; and determining, by the one or more processors, the first and second groups of computing devices based on the calculated compute utilizations.

In some examples, the compute load may be an amount of computations performed over a predefined duration of time, the amount of available computation resources may be a maximum amount of computations that can be performed by the group of computing devices over the predefined duration of time, and the compute utilization may be a ratio of the compute load to the amount of available computation resources.

In some examples, the predefined duration of time may be one day, one week, one month or one year.

In some examples, determining the compute load may include: determining, by the one or more processors, a plurality of projects assigned to the group of computing devices; for each determined project: accessing, by the one or more processors, a job log of queries of the project; determining, by the one or more processors, a project compute load of the project based on the job log of queries; and calculating, by the one or more processors, a sum of the project compute loads of the plurality of projects.

In some examples, determining the transfer of one or more projects between the plurality of groups of computing devices that reduces the compute utilization disparity between the first and second groups of computing devices may include at least one of: determining that the transfer decreases the compute utilization of the first group of computing devices; or determining that the transfer increases the compute utilization of the second group of computing devices.

In some examples, the method may further include storing, by the one or more processors, an assignment map indicating a mapping of project to the plurality of groups of computing devices in accordance with the determined transfer of one or more projects between the plurality of groups of computing devices.

In some examples, the method may further include: determining, by the one or more processors, one or more secondary cost factors associated with transferring the one or more projects between the plurality of groups of computing devices; assigning, by the one or more processors, a first weighting value to the compute utilization disparity and a respective weighting value to each of the one or more secondary factors; and calculating, by the one or more processors, a sum of the weighted compute utilization disparity and the weighted secondary cost factors. The determined transfer of the one or more projects between the groups of computing devices may reduce the calculated sum.

In some examples, the method may further include the one or more secondary cost factors may include at least one of: a network bandwidth cost of transferring the one or more projects between the groups of computing devices; or a network communication cost of communicating data between the groups of computing devices.

In some examples, determining the transfer of one or more projects between the plurality of groups of computing devices may be performed by one of a naïve solver, a greedy algorithm solver, or a mixed integer problem solver.

Another aspect of the present disclosure is directed to a system for load balancing among a plurality of groups of computing devices, each group comprising one or more respective computing devices. The system may include one or more memories and one or more processors in communication with the one or more memories. The one or more processors may be configured to: determine a first group of computing devices having a highest level of compute utilization and a second group of computing devices having a lowest level of compute utilization; determine a transfer of one or more projects between the plurality of groups of computing devices that reduces a compute utilization disparity between the first and second groups of computing devices; and direct the plurality of groups of computing devices to execute the determined transfer.

In some examples, the one or more processors may be configured to: for each group of computing devices: determine a compute load of the group of computing devices; determine an amount of available computation resources of the group of computing devices; and calculate a compute utilization of the group of computing devices based on the compute load and the amount of available computation resources; and determine the first and second groups of computing devices of the plurality of groups of computing devices based on the calculated compute utilizations.

In some examples, the compute load may be an amount of computations performed over a predefined duration of time, the amount of available computation resources may be a maximum amount of computations that can be performed by the group of computing devices over the predefined duration of time, and the compute utilization may be a ratio of the compute load to the amount of available computation resources.

In some examples, the predefined duration of time may be one day, one week, one month or one year.

In some examples, the one or more processors may be configured to: determine a plurality of projects assigned to the group of computing devices; for each determined project: access a job log of queries of the project; and determine a project compute load of the project based on the job log of queries; calculate a sum of the project compute loads of the plurality of projects.

In some examples, the one or more processors may be configured to determine the transfer of one or more projects between the plurality of groups of computing devices that reduces the compute utilization disparity between the first and second groups of computing devices based on at least one of: the transfer decreasing the compute utilization of the first group of computing devices; or the transfer increasing the compute utilization of the second group of computing devices.

In some examples, the one or more processors may be configured to store an assignment map indicating a mapping of project to the plurality of groups of computing devices in accordance with the determined transfer of one or more projects between the plurality of groups of computing devices.

In some examples, the one or more processors may be configured to: determine one or more secondary cost factors associated with transferring the one or more projects between the plurality of groups of computing devices; assign a first weighting value to the compute utilization disparity and a respective weighting value to each of the one or more secondary factors; and calculate a sum of the weighted compute utilization disparity and the weighted secondary cost factors. The determined transfer of the one or more projects between the groups of computing devices may reduce the calculated sum.

In some examples, the one or more secondary cost factors may include at least one of: a network bandwidth cost of transferring the one or more projects between the groups of computing devices; or a network communication cost of communicating data between the groups of computing devices.

In some examples, the one or more processors may be configured to determine the transfer of one or more projects between the plurality of groups of computing devices by one of a naïve solver, a greedy algorithm solver, or a mixed integer problem solver.

DETAILED DESCRIPTION

Overview

The present disclosure improves compute utilization balancing among the computing devices of the computing system. This is accomplished using an assignment solver to analyze computation costs for each of the computing devices of the computing system, whereby a solution that minimizes computation disparity among the computing devices may be considered an optimized storage solution. Based on the analysis, the assignment solver can reassign projects from computing devices with relatively high computation costs to computing devices with relatively low computation costs in order to achieve the reduced or minimized computation disparity.

In some examples, the computation cost optimization may be the sole factor used by the assignment solver to balance storage among the plurality of computing devices. In other examples, the storage cost optimization may be one of multiple factors used to balance storage. For instance, the improvement to computation disparity among the computing devices may be factored against the cost of moving projects from one computing device to another computing device. Additionally or alternatively, the improvement to computation disparity among the computing devices may be factored against the communication costs resulting from assigning projects that share a data set to separate computing devices. These factors, along with other factors, may be balanced by the assignment solver in order to derive a more holistic cost optimization for both storage and communication at the computing system.

While the concepts described herein may be used to manage data across a plurality of computing devices, it should be understood that such concepts may also be applied to other network architectures, such as those utilizing cells.

Example Systems

Figure 1:
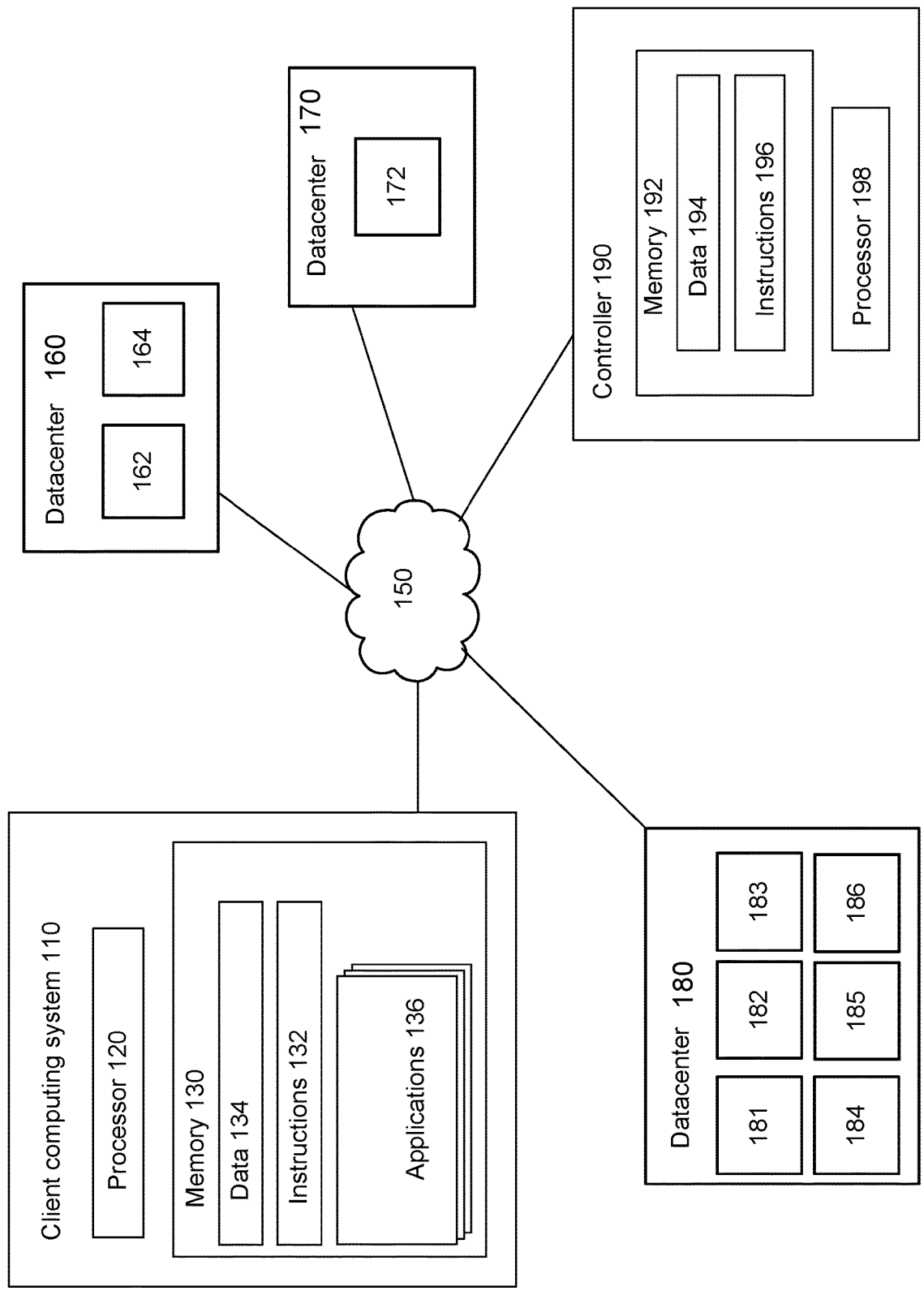
FIG. 1 is a block diagram of an example system in accordance with an aspect of the present disclosure.

FIG. 1 illustrates an example system 100 including a distributed computing environment. A plurality of datacenters 160, 170, 180 may be communicatively coupled, for example, over a network 150. The datacenters 160, 170, 180 may further communicate with one or more client devices, such as client 110, over the network 150. Thus, for example, the client 110 may execute operations in "the cloud." In some examples, the datacenters 160, 170, 180 may further communicate with a controller 190.

The datacenters 160-180 may be positioned a considerable distance from one another. For example, the datacenters may be positioned in various countries around the world. Each datacenter 160, 170, 180 may include one or more computing devices, such as processors, servers, shards, cells, or the like. For example, as shown in FIG. 1, datacenter 160 includes computing devices 162, 164, datacenter 170 includes computing device 172, and datacenter 180 includes computing devices 181-186. Programs may be executed across these computing devices, for example, such that some operations are executed by one or more computing devices of a first datacenter while other operations are performed by one or more computing devices of a second datacenter. In some examples, the computing devices in the various datacenters may have different capacities. For example, the different computing devices may have different processing speeds, workloads, etc. While only a few of these computing devices are shown, it should be understood that each datacenter 160, 170, 180 may include any number of computing devices, and that the number of computing devices in a first datacenter may differ from a number of computing devices in a second datacenter. Moreover, it should be understood that the number of computing devices in each datacenter 160-180 may vary over time, for example, as hardware is removed, replaced, upgraded, or expanded.

In some examples, each datacenter 160-180 may also include a number of storage devices (not shown), such as hard drives, random access memory, disks, disk arrays, tape drives, or any other types of storage devices. The storage devices may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as cabling, routers, etc. Further, in some examples the datacenters 160-180 may be virtualized environments. Further, while only a few datacenters 160-180 are shown, numerous datacenters may be coupled over the network 150 and/or additional networks.

In some examples, the controller 190 may communicate with the computing devices in the datacenters 160-180, and may facilitate the execution of programs. For example, the controller 190 may track the capacity, status, workload, or other information of each computing device, and use such information to assign tasks. The controller 190 may include a processor 198 and memory 192, including data 194 and instructions 196, similar to the client 110 described above. In other examples, such operations may be performed by one or more of the computing devices in one of the datacenters 160-180, and an independent controller may be omitted from the system.

Each client 110 may be, for example, a computer intended for use by a person or an entity. The client 110 may have all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor 120, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 110 may contain a processor 120, memory 130, and other components typically present in general purpose computers. The memory 130 can store information accessible by the processor 120, including instructions 132 that can be executed by the processor 120. Memory can also include data 134 that can be retrieved, manipulated or stored by the processor 120. The memory 130 may be a type of non-transitory computer readable medium capable of storing information accessible by the processor 120, such as a hard-drive, solid state drive, tape drive, optical storage, memory card, ROM, RAM, DVD, CD-ROM, write-capable, and read-only memories. The processor 120 can be a well-known processor or other lesser-known types of processors. Alternatively, the processor 120 can be a dedicated controller such as an ASIC.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance.

The data 134 can be retrieved, stored or modified by the processor 120 in accordance with the instructions 132. For instance, although the system and method is not limited by a particular data structure, the data 134 can be stored in computer registers, in a relational database as a table having a plurality of different fields and records, or XML documents. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data.

Applications 136 may be used for any of a variety of operations. The applications 136 may, for example, be downloaded, executable from the instructions 132, or remotely accessed. In some examples, the application may be remotely executed. For example, applications on the client device may be executed in the cloud.

Although FIG. 1 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel.

Client 110, datacenters 160-180, and control 190 can be capable of direct and indirect communication such as over network 150. For example, using an Internet socket, a client 110 can connect to a service operating on remote servers through an Internet protocol suite. Servers can set up listening sockets that may accept an initiating connection for sending and receiving information. The network 150, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Figure 2:
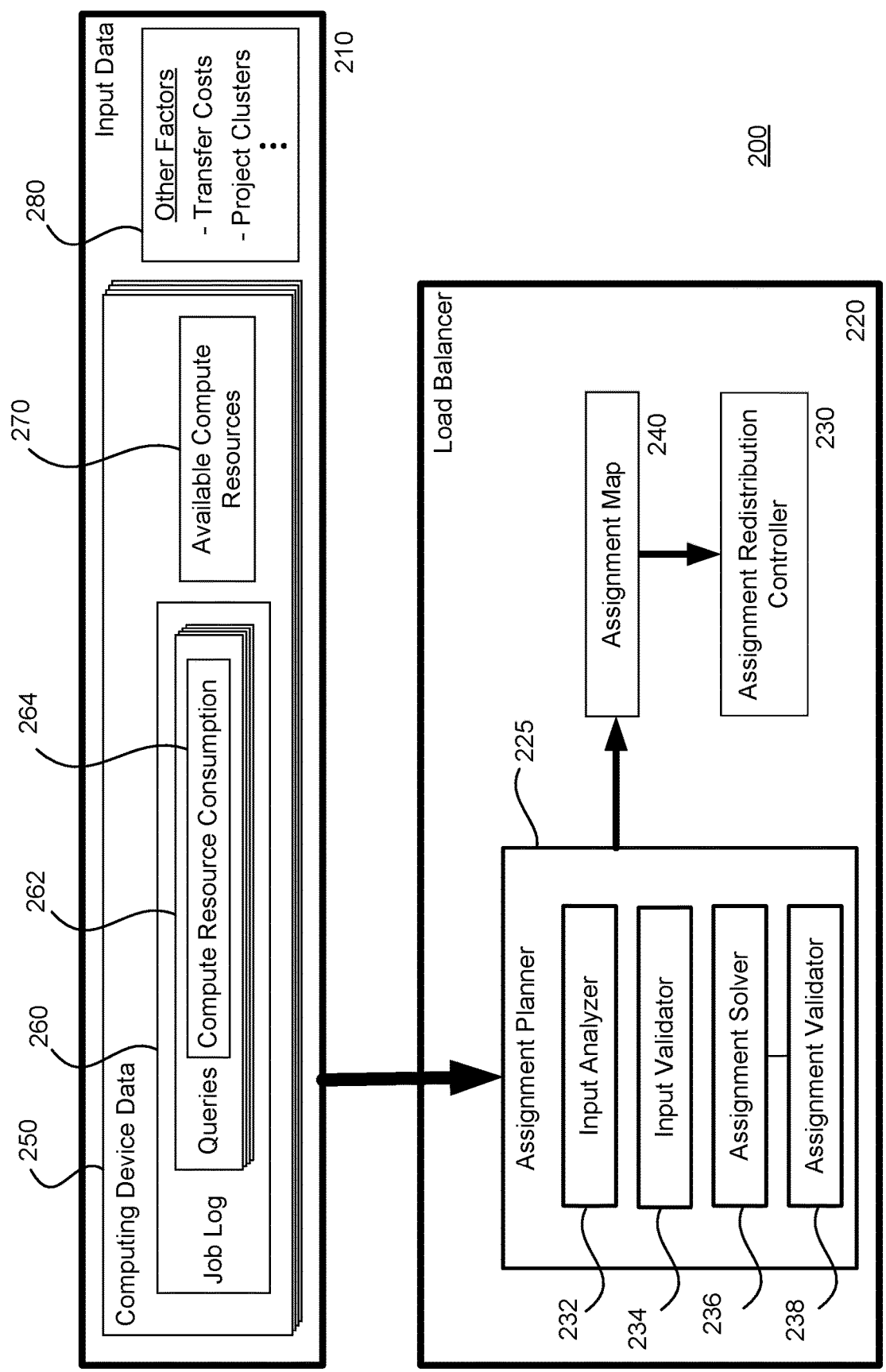
FIG. 2 is a block diagram of an example balancer in accordance with an aspect of the present disclosure.

FIG. 2 illustrates an example architecture of a system 200 for optimizing the assignment of projects to computing devices within the distributed network. The system 200 may reside, for example, on a computing device in one of the datacenters 160-180 of FIG. 1, on the controller 190 of FIG. 1, or on some combination thereof. The system 200 includes a load balancer 220, which may be responsible for assigning reservations to computation servers in a balanced fashion. For example, the load balancer 220 may balance allocation of tasks within a datacenter or among a global distributed system. The load balancer 220 may, for example, compute explicit project-to-server assignment mappings to achieve proper load balancing. It may handle both static query routing, when all servers are available, and dynamic query routing, when servers are drained. Additionally, the load balancer 220 may provide a robust way to publish these assignments to all components in a data analysis engine that use this information.

The load balancer 250 may include an assignment planner 225, which may run as a sub-component in the load balancer 220. For example, the assignment planner 225 may be a module, such as a C++ or other type of module. In some instances, the assignment planner 225 may replace an existing routing computation component. While in some examples a single assignment planner may produce assignments for each region, in other examples additional or fewer assignment planners may be implemented. For example, an assignment planner may produce assignments for a globally distributed system, multiple assignment planners may be implemented within a given region, etc.

The assignment planner 225 may be responsible for computing and publishing the project-to-server assignment mappings, or assignments. In computing the assignments, the assignment planner 225 takes into account a variety of factors, such as a hierarchy of the organization and projects to be assigned, on-demand compute consumption, storage volume (e.g., by organization), server storage and compute capacities, etc. In some examples, the assignment planner 225 may also take into account compute reservations, such as resources guaranteed to a particular customer. To get the latest reservation information, for example, the assignment planner 225 may subscribe to periodic update, receive push notifications when new reservations are made, etc. The information considered by the assignment planner 225 in generating a new assignment scheme may include historical query information, such as metadata snapshots, datasets, and the like.

Periodically, the assignment planner 225 may fetch data from sources and predict future events, taking such predictions into account in determining assignments. For example, the assignment planner 225 may predict turndown, that a customer is about to send large amounts of data, potential reservation changes, etc. Such events may impact server size, project storage, or other constraints.

The assignment planner 225 may include a number of components, such as an input collector/analyzer 232, and one or more solvers 236. It should be understood that these components are merely examples, and that additional, fewer, or different components may be included in the assignment planner 225.

The input collector/analyzer 232 collects and analyzes the input data 210 of the system. The input data 210 may include computing device data 250 from which the project assignment redistribution among the computing devices may be determined. Such computing device data 250 may be provided from each of the computing devices of the system. For each computing device, the computing device data 250 may include a job log 260 of queries 262. Each query 262 included in the job log 260 may further indicate an amount of compute resource consumption 264 associated with the query. The compute resource consumption 264 may be a compute load of the logged query 262, whereby the compute load is measured by the amount of compute resources consumed in executing the query. One way of measuring compute load is according to CPU-ms, whereby "CPU" refers to an atomized unit of compute resources at a query engine at which the query is executed, and one CPU-ms represents using one atomized unit of compute resources for one millisecond of time. For each computing device, the computing device data 250 may further indicate the available compute resources 270 at the computing device. The available compute resources 270 may be quantified using the same or similar units as the compute resource consumption 264 of the queries 262 executed at the computing device, so that the compute resource consumption 264 and available compute resources 270 can be compared to one another.

The input data 210 may further include additional data 280 relating to other factors on which the redistribution of project assignment among the computing devices may be based. One example factor is a cost of transferring the assignment of a project between computing devices since the transfer required data to be transmitted from one computing device to another computing device. Another example factor is project clusters. Projects may be clustered if they are executed on common data sets, whereby those common data sets may be stored at or close to the computing device of the project cluster. If reassigning a project from one computing device to another computing device causes projects executed on the same data set to be unclustered, then this may factor against the reassignment. Conversely, if reassigning a project from one computing device to another computing device causes projects executed on the same data set to be clustered, then this may factor in favor of the reassignment.

The input collector/analyzer 232 of the assignment planner 225 may receive these and other project inputs from metadata snapshots of each project. The metadata may include additional information for determining an arrangement of project assignments, such as organization information for each project, reservation information for the projects, both soft and hard groupings for data sets and projects, dependency relationships between data sets and projects based on historical data such as a query history, and so on.

The assignment planner 225 may use a solver 236 to compute a viable assignment. The solver may be, for example, a naïve solver, a greedy algorithm solver, an optimized solver such as a mixed integer problem solver, or any other type of solver. The solver 236 takes the inputs and runs an assignment algorithm. The assignment solver 236 may output a set of project assignments based on the received inputs 210.

The assignment planner 225 may output the set of project assignments determined by the solver 236 to an assignment map 240 for mapping the determined location assignments of the projects executed in the distributed system 100. The assignment map 240 may be used by an assignment redistribution controller 250 to redistribute the projects across the distributed network according to the assignment map 240. Redistribution may involve moving a project from one computing device to another computing device, creating replicas of projects, and so on. The assignment redistribution controller 250 may be implemented as a library in the balancer 220.

The assignment planner 225 may run continuously, on a schedule, on demand, or in response to an environmental change or configuration change. It may operate in a dry-run mode, where it generates assignments but does not apply them, or in an autonomous mode, where it automatically sends newly generated assignments to the assignment redistribution controller 250 for immediate application.

Example Methods

Figure 4:
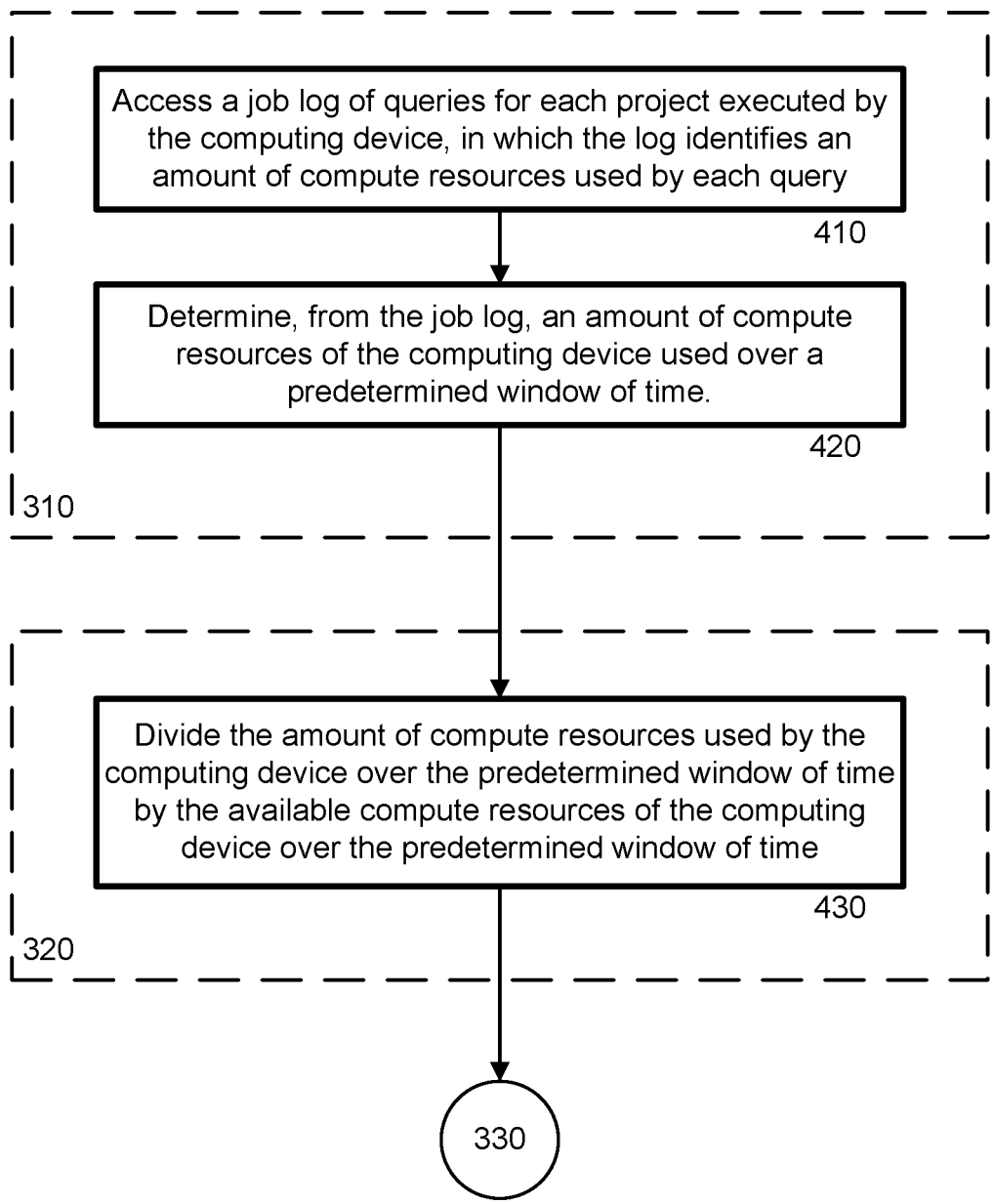
FIGS. 4 and 5 are flow diagrams of example subroutines of the routine of FIG. 3.
Figure 5:
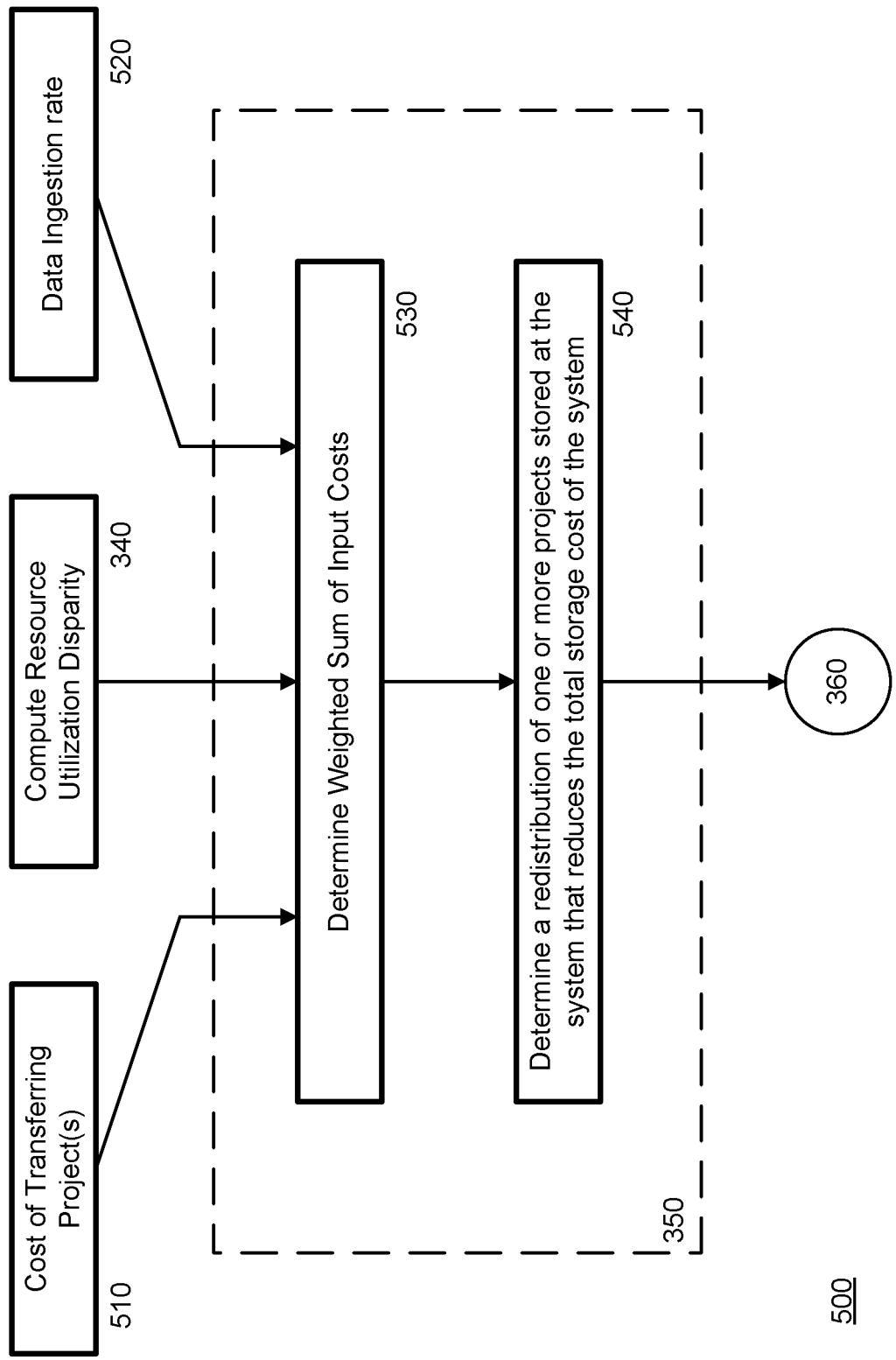

Example routines performed by the assignment planner, such as the assignment planner 225 of FIG. 2, is described in greater detail in connection with the diagrams of FIGS. 3-5. It should be understood that the routines described herein are merely examples, and in other examples, certain steps may be added, subtracted, replaced or reordered.

Figure 3:
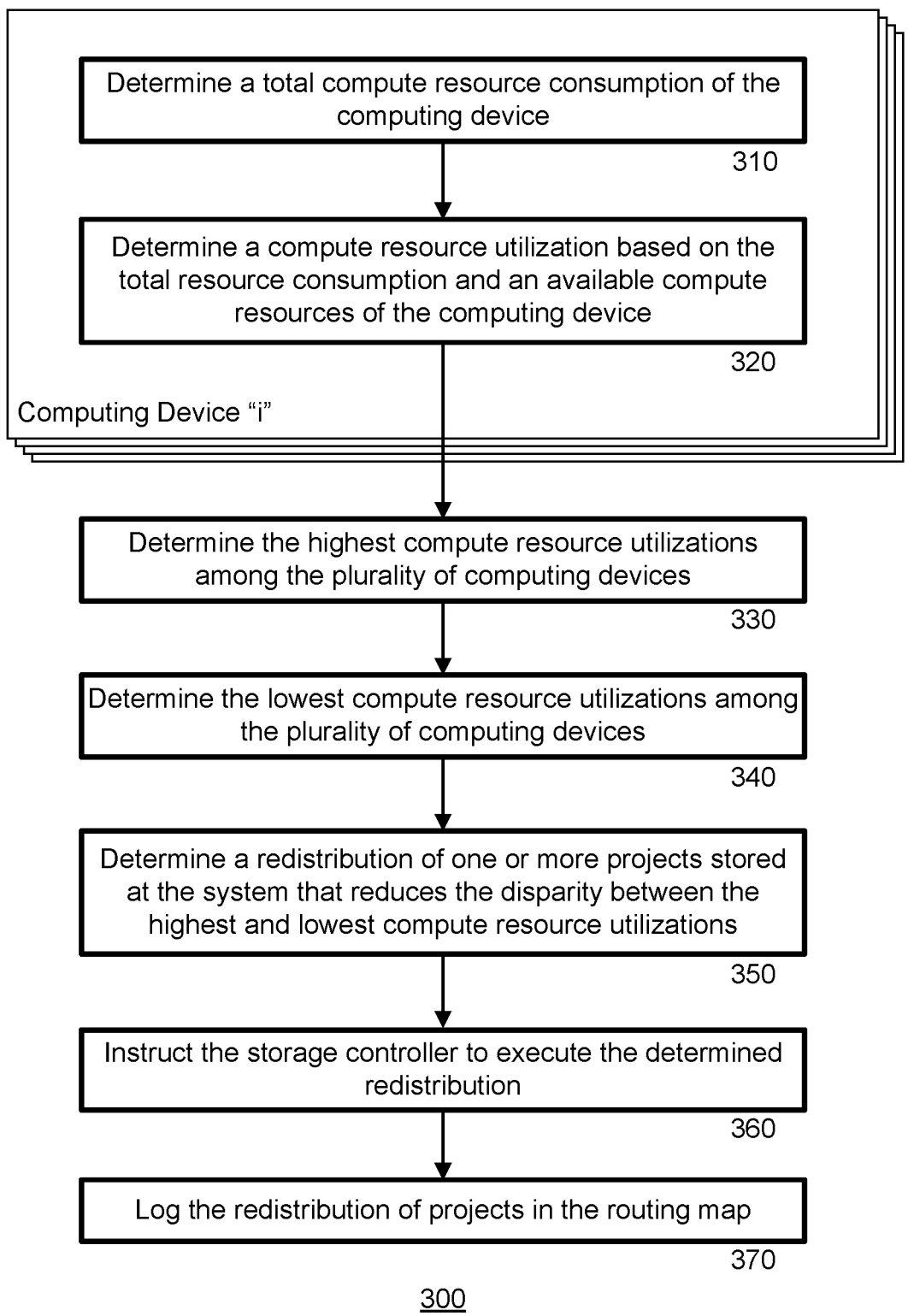
FIG. 3 is a flow diagram of an example balancing routine according to an aspect of the present disclosure.

The example routine 300 of FIG. 3 involves minimizing a compute utilization disparity between the computing device of the system having a highest level of compute utilization and the computing device of the system having a lowest level of compute utilization. This may be accomplished by determining the compute utilization disparity and, through use of the assignment solver, determining an optimized storage solution for projects in the system that minimizes or at least reduces the compute utilization disparity. Projects may then be transferred between computing devices according to the optimized storage solution.

At block 310, for a given computing device of the system, one or more processors may determine a total compute resource consumption of the computing device. Subroutine 400 of FIG. 4 depicts one example implementation of this determination. In the example subroutine 400, at block 410, the one or more processors access a job log of queries for each project executed by the computing device. The log identifies an amount of compute resources used by each query. At block 420, the one or more processors determine, from the job log, an amount of compute resources of the computing device used over a predetermined window of time. In this regard, the total compute resource consumption may be a sum of resources consumed by each of the queries in the job log of the computing device over a predetermined period of time. The period of time may be selected to conform to time-cyclical patterns in compute utilization, such as a period of a day, a week, two weeks, a month, a year, and so on. In many systems, daily and weekly patterns are most pronounced due to lighter utilization overnight and during weekends, respectively. In other systems, monthly, quarterly or yearly patterns may be pronounced due to organizations executing projects tied to end-of-month, end-of-quarter or end-of-year analyses, respectively.

Returning to FIG. 3, operations may continue at block 320, in which for the same given computing device, the one or more processors may determine a compute resource utilization based on the total resource consumption and an available compute resources of the computing device. Subroutine 400 of FIG. 4 depicts one example implementation of this determination. In the example subroutine 400, at block 430, the one or more processors may divide the amount of compute resources used by the computing device over the predetermined window of time by the available compute resources of the computing device over the predetermined window of time. The result may be a percentage of consumption of the available resources. Since different computing devices of the system may have different amounts of available compute resources, characterizing utilization in terms of percentage allows for a more even comparison of utilization between the computing devices. However, for a system in which all computing devices have the same or similar amounts of available compute resources, it may be possible to rely on the total resource consumption instead of the compute resource utilization.

Blocks 310 and 320 may be executed for each of the computing devices of the systems, such that the load at each computing device may be individually determined. This results in multiple resource utilization values being calculated by the assignment planner. The multiple resource utilization values may be stored in memory for further processing. In some examples, the resource utilization values may be calculated by the assignment planner, but in other examples, these values may be independently calculated separately from the assignment planner, such as at the individual computing devices, and then provided to the assignment planner for the further processing.

Once compute loads for each of the computing devices have been calculated, operations may proceed to block 330, in which the one or more processors may determine the highest compute resource utilization among the plurality of computing devices. This may involve identifying a maximum calculated resource utilization value from block 320 from the calculated multiple resource utilization values in storage. Alternatively, instead of storing resource utilization values, only the maximum value may be stored, and may be replaced when a larger value is calculated. At block 340, the one or more processors of the assignment planner may determine the lowest compute resource utilization among the plurality of computing devices. This may involve identifying a minimum calculated resource utilization value from block 320 from the calculated multiple resource utilization values in storage. Alternatively, instead of storing resource utilization values, only the minimum value may be stored, and may be replaced when a smaller value is calculated.

The difference between the determined highest and lowest compute resource utilizations may be indicative of an overall resource utilization disparity within the computing system, which itself may indicate that the compute resources are not properly balanced.

For instance, consider a system including first, second and third computing devices for which the compute resource utilizations are 92%, 32% and 18%, respectively. The maximum compute resource utilization is 92% for the first device, and the minimum compute resource utilization is 18% for the third device, making the calculated difference 74%.

At block 350, the one or more processors may determine a redistribution of one or more projects stored at the system that reduces the disparity in compute resource utilization. In some instances, reducing the disparity may involve determining a transfer that increases the compute resource utilization of the computing device having the lowest compute resource utilization among the plurality of computing devices. Additionally or alternatively, reducing the disparity may involve determining a transfer that decreases the compute resource utilization of the computing device having the highest compute resource utilization among the plurality of computing devices. Additionally or alternatively, the one or more processors may directly track the difference between the highest and lowest compute resource utilizations, and the transfer may reduce the difference between the highest and lowest compute resource utilizations. As described herein, the redistribution may be determined by the assignment planner, which may include a solver that operates according to an algorithm, such as a greedy solver, a mixed integer solver, or other known solvers. The redistribution may involve moving at least one project from one computing device to another computing device, such as from the most underutilized computing device to the most overutilized computing device. Additionally or alternatively, the redistribution may involve adding at least one new project to at least one of the computing devices of the systems, such as to the most underutilized computing device.

For instance, continuing with the above example, the assignment planner may move projects from the first computing device with 92% utilization to the third computing device with 18% utilization. This may result, for the sake of example, in a compute resource utilization of 52%, 32% and 55%, respectively. Then, the difference between the maximum utilization of 55% and the minimum utilization of 32% is only 23%, which is reduced from 74%, meaning that loads at the computing devices are more properly balanced after the redistribution. It should be recognized that the increase of 37% utilization at the third computing device may correspond to a reduction of 40% at the first computing device if the third computing device has more overall compute resources allocated therein, since utilization is measured in this example by percentage and not by total compute resources consumed.

At block 360, the one or more processors may instruct the storage controller to execute the determined redistribution. The storage controller may then execute the instructed redistribution, whereby the projects may be reallocated from one computing device to another computing device, and transported through a network connecting the computing device of the system according to the reallocation. The redistribution may result in a lowered compute utilization disparity for the system as a whole.

At block 370, the redistribution of project assignments may be logged. Logging may be performed at a routing map, which may be stored at the assignment planner or in memory separate from the assignment planner. The routing map may indicate a respective location of each project stored in the system, as well storage locations of the data sets that the assigned projects may operate on. Operations in the system may be performed according to the routing information stored in the routing map. Thus, when projects are relocated according to a redistribution determination by the assignment planner, updating the log map to reflect the redistribution may avoid miscommunications within the system during operation of one or more reallocated projects.

The routine 300 of FIG. 3 generally describes an assignment planner rebalancing compute loads across multiple computing devices using compute utilization parity as a sole factor. However, in other instances, compute utilization parity may be one of multiple factors for which the assignment solver of the assignment planner optimizes the project assignment distribution. FIG. 5 is a subroutine 500 of routine 300 depicting how the routine 300 may take other factors into account to determine the redistribution of projects across the system.

Blocks 510 and 520 of FIG. 6 depict secondary inputs to the assignment planner. Block 510 represents a cost of transfer input indicating a cost for moving a project from one computing device to another computing device. Block 520 depicts data ingestion rate input indicating a cost of transporting data from a data set on which a project operates for a given assignment plan of project. These inputs should be understood as examples of possible inputs to the system, as other inputs reflecting other project assignment factors may also be received by the assignment planner.

At block 530, the one or more processors of the assignment planner may determine a sum of the received cost inputs for a given set of project assignments. Different factors within the sum may be weighted differently, such as according to their relative importance. For instance, in one example system, transporting projects from one computing device to another may be especially costly, whereby the cost of this factor may be greater than for other factors. In another example system designed for projects with a high degree of clustering, there may be added emphasis on data ingestion for operating the projects, in which case the weight of the data ingestion rate cost may be increased. Other weightings of various factors may be set as suitable for each given system.

At block 540, the one or more processors of the assignment planner may determine a redistribution of one or more projects stored at the system that reduces the total cost of the system. In the case of FIG. 5, reducing the total cost may or may not involve reducing the compute utilization disparity. For instance, in a given scenario, the cost of increasing load imbalance may be outweighed by the cost savings in decreasing other cost factors of the system. Nonetheless, in many scenarios, reducing the total cost will also result in a reduction of compute utilization disparity and, in turn, load imbalance.

The determined redistribution of projects may be output from block 540, and operations may continue with block 360 as described in connection with the routine 300 of FIG. 3.

The above examples generally describe redistribution of one or more projects among a plurality of individual computing devices such as computers, servers, and the like. However, it should be understood that the same or similar principles may be applied to other network architectures, such as those utilizing "cells." For example, a cell is a network of tightly connected computing devices that, by way of example, may cooperatively run processes, has shared storage, and has very low network latency and high throughput between computing devices in the cell. Accordingly, while the examples herein are primarily described with respect to calculating compute resource consumption and utilization and other costs for individual computing devices, it should be understood that the same or similar calculations may be performed for groups of computing devices such as cells. Likewise, while the examples herein are primarily described with respect to assigning projects to individual computing devices, it should be understood that the same or similar assignment mappings may be generated and instructions may be transmitted for assigning projects and data sets to groups of multiple computing devices such as cells, it should be understood that the examples similarly apply in assigning projects to groups of multiple computing devices such as cells.

For example, a system may include multiple computing cells, each computing cell including numerous computing devices and having assigned to it multiple projects. Compute loads may differ greatly from project to project, meaning that some projects may consume more compute cell resources than other projects. The methods and systems of the present disclosure can achieve a storage balance, as well as compute resource parity and load balancing, between cells by reassigning projects from one cell to another in accordance with the principles described herein. As a result, computation loads as well as other factors may be properly and dynamically balanced throughout the system. Overall, the optimized dynamic load balancing may reduce overloading at individual computing devices or cells. This may result in fewer errors experienced by projects stored in the system, resulting in less downtime and failures, and overall an improved user experience.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of load balancing among three or more groups of computing devices, each group comprising one or more respective computing devices, the method comprising:
    determining, by one or more processors, from among the three or more groups of computing devices, a first group of computing devices having a highest level of compute utilization and a second group of computing devices having a lowest level of compute utilization;
    determining, by the one or more processors, a transfer of one or more projects between the groups of computing devices that reduces a compute utilization disparity between the first and second groups of computing devices; and
    directing, by the one or more processors, the groups of computing devices to execute the determined transfer.

2. The method of claim 1, wherein determining the compute utilization density comprises:
    for each group of computing devices:
        determining, by the one or more processors, a compute load of the group of computing devices;
        determining, by the one or more processors, an amount of available computation resources of the group of computing devices; and
        calculating, by the one or more processors, a compute utilization of the group of computing devices based on the compute load and the amount of available computation resources; and
    determining, by the one or more processors, the first and second groups of computing devices based on the calculated compute utilizations.

3. The method of claim 2, wherein the compute load is an amount of computations performed over a predefined duration of time, wherein the amount of available computation resources is a maximum amount of computations that can be performed by the group of computing devices over the predefined duration of time, and wherein the compute utilization is a ratio of the compute load to the amount of available computation resources.

4. The method of claim 3, wherein the predefined duration of time is one day, one week, one month or one year.

5. The method of claim 3, wherein determining the compute load comprises:
    determining, by the one or more processors, a plurality of projects assigned to the group of computing devices;
    for each determined project:
        accessing, by the one or more processors, a job log of queries of the project; and
        determining, by the one or more processors, a project compute load of the project based on the job log of queries; and
    calculating, by the one or more processors, a sum of the project compute loads of the plurality of projects.

6. The method of claim 1, wherein determining the transfer of one or more projects between the groups of computing devices that reduces the compute utilization disparity between the first and second groups of computing devices comprises at least one of:
    determining that the transfer decreases the compute utilization of the first group of computing devices; or
    determining that the transfer increases the compute utilization of the second group of computing devices.

7. The method of claim 1, further comprising storing, by the one or more processors, an assignment map indicating a mapping of the projects to the groups of computing devices in accordance with the determined transfer of one or more projects between the groups of computing devices.

8. The method of claim 1, further comprising:
    determining, by the one or more processors, one or more secondary cost factors associated with transferring the one or more projects between the groups of computing devices;
    assigning, by the one or more processors, a first weighting value to the compute utilization disparity and a respective weighting value to each of the one or more secondary factors; and
    calculating, by the one or more processors, a sum of the weighted compute utilization disparity and the weighted secondary cost factors,
    wherein the determined transfer of the one or more projects between the groups of computing devices reduces the calculated sum.

9. The method of claim 6, wherein the one or more secondary cost factors includes at least one of:
    a network bandwidth cost of transferring the one or more projects between the groups of computing devices; or
    a network communication cost of communicating data between the groups of computing devices.

10. The method of claim 1, wherein determining the transfer of one or more projects between the groups of computing devices is performed by one of a naïve solver, a greedy algorithm solver, or a mixed integer problem solver.

11. A system for load balancing among three or more groups of computing devices, each group comprising one or more respective computing devices, the system comprising:
    one or more memories; and one or more processors in communication with the one or more memories, the one or more processors configured to:

determine, from among the three or more groups of computing devices, a first group of computing devices having a highest level of compute utilization and a second group of computing devices having a lowest level of compute utilization;

determine a transfer of one or more projects between the groups of computing devices that reduces a compute utilization disparity between the first and second groups of computing devices; and direct the groups of computing devices to execute the determined transfer.

12. The system of claim 11, wherein the one or more processors are configured to:

for each group of computing devices:
 determine a compute load of the group of computing devices;
 determine an amount of available computation resources of the group of computing devices; and
 calculate a compute utilization of the group of computing devices based on the compute load and the amount of available computation resources; and determine the first and second groups of computing devices of the groups of computing devices based on the calculated compute utilizations.

13. The system of claim 12, wherein the compute load is an amount of computations performed over a predefined duration of time, wherein the amount of available computation resources is a maximum amount of computations that can be performed by the group of computing devices over the predefined duration of time, and wherein the compute utilization is a ratio of the compute load to the amount of available computation resources.

14. The system of claim 13, wherein the predefined duration of time is one day, one week, one month or one year.

15. The system of claim 13, wherein the one or more processors are configured to:

determine a plurality of projects assigned to the group of computing devices;

for each determined project:
 access a job log of queries of the project; and
 determine a project compute load of the project based on the job log of queries; and
calculate a sum of the project compute loads of the plurality of projects.

16. The system of claim 1, wherein the one or more processors are configured to determine the transfer of one or more projects between the groups of computing devices that reduces the compute utilization disparity between the first and second groups of computing devices based on at least one of:

the transfer decreasing the compute utilization of the first group of computing devices; or the transfer increasing the compute utilization of the second group of computing devices.

17. The system of claim 11, wherein the one or more processors are configured to store an assignment map indicating a mapping of the projects to the groups of computing devices in accordance with the determined transfer of one or more projects between the groups of computing devices.

18. The system of claim 11, wherein the one or more processors are configured to:

determine one or more secondary cost factors associated with transferring the one or more projects between the groups of computing devices;

assign a first weighting value to the compute utilization disparity and a respective weighting value to each of the one or more secondary factors; and calculate a sum of the weighted compute utilization disparity and the weighted secondary cost factors, wherein the determined transfer of the one or more projects between the groups of computing devices reduces the calculated sum.

19. The system of claim 16, wherein the one or more secondary cost factors includes at least one of:

a network bandwidth cost of transferring the one or more projects between the groups of computing devices; or a network communication cost of communicating data between the groups of computing devices.

20. The system of claim 11, wherein the one or more processors are configured to determine the transfer of one or more projects between the groups of computing devices by one of a naïve solver, a greedy algorithm solver, or a mixed integer problem solver.

* * * * *